(12) United States Patent
Palazzola et al.

(10) Patent No.: US 10,549,953 B2
(45) Date of Patent: Feb. 4, 2020

(54) ELEVATOR BELT POSITION TRACKING SYSTEM

(71) Applicants: ThyssenKrupp AG, Essen (DE); ThyssenKrupp Elevator AG, Essen (DE)

(72) Inventors: Michael Palazzola, Horn Lake, MS (US); Peter Feldhusen, Collierville, TN (US)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 359 days.

(21) Appl. No.: 15/651,473

(22) Filed: Jul. 17, 2017

(65) Prior Publication Data
US 2019/0016562 A1 Jan. 17, 2019

(51) Int. Cl.
| | | |
|---|---|---|
| *B66B 1/34* | (2006.01) | |
| *B66B 7/12* | (2006.01) | |
| *B66B 3/00* | (2006.01) | |
| *B66B 5/00* | (2006.01) | |
| *G01D 5/16* | (2006.01) | |

(52) U.S. Cl.
CPC .............. *B66B 7/123* (2013.01); *B66B 3/002* (2013.01); *B66B 5/0025* (2013.01); *B66B 5/0031* (2013.01); *G01D 5/16* (2013.01)

(58) Field of Classification Search
CPC ....... B66B 7/123; B66B 3/002; B66B 5/0025; B66B 5/0031; G01D 5/16
USPC ........ 187/247, 250–254, 256, 264–266, 287, 187/407, 414; 474/100, 166, 177, 178; 198/794, 805, 810.01, 810.02, 810.03
See application file for complete search history.

(56) References Cited

U.S. PATENT DOCUMENTS

| | | | | |
|---|---|---|---|---|
| 4,145,920 A | * | 3/1979 | Yamagami | ............ B66B 7/1223 187/266 |
| 6,267,205 B1 | | 7/2001 | Piech et al. | |
| 6,349,796 B1 | * | 2/2002 | Tauchi | .................. B66B 1/3492 187/393 |
| 6,364,062 B1 | * | 4/2002 | Ericson | ................... B66B 7/062 187/264 |
| 6,591,944 B2 | * | 7/2003 | St. Pierre | .................. B66B 7/06 187/250 |
| 6,633,159 B1 | | 10/2003 | Robar et al. | |
| 6,830,131 B2 | * | 12/2004 | Mustalahti | .......... B66B 11/0045 187/254 |

(Continued)

FOREIGN PATENT DOCUMENTS

| | | |
|---|---|---|
| JP | 2008184253 A | 8/2008 |
| WO | 2014001371 A1 | 1/2014 |

*Primary Examiner* — Anthony J Salata
(74) *Attorney, Agent, or Firm* — The Webb Law Firm

(57) ABSTRACT

An elevator belt position tracking system including a magnetic field producer located in operational proximity to an elevator sheave carrying an elevator belt to produce a magnetic field encompassing the elevator belt, a magnetic sensor located in operational proximity to the sheave carrying the elevator belt, the magnetic sensor comprising a plurality of signal channels spaced apart along a width of the magnetic sensor. The respective signal channels are activated by the proximity of the elevator belt to the signal channels as the elevator belt passes through the magnetic field generated by the magnetic field producer to determine a lateral position of the elevator belt on the sheave.

20 Claims, 7 Drawing Sheets

(56) References Cited

U.S. PATENT DOCUMENTS

| | | | |
|---|---|---|---|
| 7,503,433 B2 * | 3/2009 | Wang | B66B 11/008 |
| | | | 187/254 |
| 8,939,262 B2 * | 1/2015 | Schienda | B66B 5/06 |
| | | | 187/287 |
| 9,078,399 B2 * | 7/2015 | Hubach | A01F 15/18 |
| 9,643,819 B2 | 5/2017 | Lotfi et al. | |
| 9,758,343 B2 | 9/2017 | Helenius | |
| 9,771,244 B2 | 9/2017 | Lehtinen et al. | |
| 10,011,464 B2 * | 7/2018 | Mupende | B66C 13/16 |
| 10,018,597 B2 * | 7/2018 | Hirokawa | G01N 29/14 |
| 10,047,848 B2 * | 8/2018 | Kaybidge | F16H 57/01 |
| 2015/0239708 A1 | 8/2015 | Palazzola et al. | |
| 2015/0329319 A1 | 11/2015 | Lehtinen et al. | |
| 2016/0046463 A1 | 2/2016 | Saarelainen et al. | |
| 2017/0233222 A1 * | 8/2017 | Puranen | B66B 1/30 |
| | | | 187/247 |

* cited by examiner

ELEVATOR BELT POSITION TRACKING SYSTEM

CROSS REFERENCE TO APPLICATION

This application incorporates by reference in its entirety U.S. Patent Application Publication No. 2015/0239708, filed Feb. 25, 2014.

BACKGROUND OF THE INVENTION

Field of the Invention

The present disclosure relates, in general, to the operation of an elevator system and, more particularly, to an elevator belt position tracking system for an elevator system.

Description of Related Art

Current elevator systems typically include an elevator car operatively connected to a tensioning unit or another elevator car to move the elevator car through a hoistway. The elevator car moves individuals to different points in a building. The elevator car and tensioning unit or second elevator car are often operatively connected with at least one elevator belt that is directed over a sheave provided at an upper location within the hoistway. A hoist motor is operatively connected to the sheave to rotate the sheave to move the elevator belt thereon. As the elevator belt is moved, the elevator car(s) are moved within the hoistway.

The sheaves are typically crowned sheaves and have a width typically about 1.5-2 times wider than the elevator belt. Due to the extended width of the sheave, the elevator belt is capable of moving sideways on the sheave surfaces during operation of the elevator system. The elevator belt can move left or right from the center of the sheave surface towards an outward flange or border of the sheave. Typically, the elevator belt may move a short distance off-center on the sheave, but not so far as to contact the flange or border of the sheave. However, during operation of the elevator system, the elevator belt may become unbalanced on the sheave and may move so far off-center so as to contact the flange or border of the sheave. The elevator belt may become unbalanced due to bad belt quality, unequal tension in the elevator belt, alignment issues with the elevator belt, or fleet angle due to defects or system settlement over time. Based on the imbalance in the system, the crown of the sheave does not center the elevator belt and the belt may run against the flange or border of the sheave, causing damage to the belt. The contact with the flange or border can cause deterioration of the elevator belt or, in extreme cases, breakage of the elevator belt.

SUMMARY OF THE INVENTION

Therefore, there is a current need in the art for an elevator belt position tracking system that is capable of tracking the position of an elevator belt relative to a sheave. There is a further need in the art for an elevator belt position tracking system that is capable of determining when an elevator belt has contacted or run against a border or flange of a sheave.

In one example of the present disclosure, an elevator belt position tracking system includes a magnetic field producer located in operational proximity to an elevator sheave carrying an elevator belt to produce a magnetic field encompassing the elevator belt, a magnetic sensor located in operational proximity to the sheave carrying the elevator belt, the magnetic sensor including a plurality of signal channels spaced apart along a width of the magnetic sensor, wherein the respective signal channels are activated by the proximity of the elevator belt to the signal channels as the elevator belt passes through the magnetic field generated by the magnetic field producer to determine a lateral position of the elevator belt on the sheave.

In another example of the present disclosure, a belt position calculating unit is used to determine the lateral position of the elevator belt on the sheave. A notification device may be provided to receive an output of the belt position calculating unit, the notification device being configured to inform a user of the lateral position of the elevator belt on the sheave. The notification device is configured to output an alert indication when the elevator belt has activated an outermost signal channel on the magnetic sensor or when the elevator belt has activated a signal channel located to the left or to the right of a sheave lateral center point by about 95%-105% of the width of the elevator belt. The notification device comprising one or more of the following: one or more displays, a remote monitoring station, a mobile device, an elevator car controller, and a master controller of an elevator system. The width of the magnetic sensor is greater than a width of the elevator belt. The width of the magnetic sensor is at least as wide as a width of a respective section of the sheave. The magnetic sensor is a giant magneto-resistance sensor. As the elevator belt moves laterally on the sheave and relative to the magnetic sensor, the plurality of signal channels are activated in succession and indicate a direction of lateral movement of the elevator belt on the sheave.

In another example of the present disclosure, an elevator system includes an elevator car, an elevator belt attached to the elevator car and reeved on an elevator drive sheave to move the elevator car through a hoistway, a hoist motor operatively connected to the drive sheave to rotate the drive sheave, and an elevator belt position tracking system, including a magnetic field producer located in operational proximity to the drive sheave carrying the elevator belt to produce a magnetic field encompassing the elevator belt, a magnetic sensor located in operational proximity to the drive sheave carrying the elevator belt, the magnetic sensor including a plurality of signal channels spaced apart along a width of the magnetic sensor, wherein the respective signal channels are activated by the proximity of the elevator belt to the signal channels as the elevator belt passes through the magnetic field generated by the magnetic field producer to determine a lateral position of the elevator belt on the drive sheave.

In another aspect of the present disclosure, the elevator belt comprises at least one internal magnetic component. A belt position calculating unit may be used to determine the lateral position of the elevator belt on the drive sheave. A notification device may be provided to receive an output of the belt position unit, the notification device being configured to inform a user of the lateral position of the elevator belt on the drive sheave. The notification device is configured to output an alert indication when the elevator belt has activated an outermost signal channel on the magnetic sensor or when the elevator belt has activated a signal channel located to the left or to the right of a sheave lateral center point by about 95%-105% of the width of the elevator belt. The notification device comprising at least one of the following: one or more displays, a remote monitoring station, a mobile device, an elevator car controller, and a master controller of the elevator system. The width of the magnetic sensor is greater than a width of the elevator belt. The width of the magnetic sensor is at least as wide as a width of the respective drive sheave section. The magnetic sensor is a giant magneto-resistance sensor. As the elevator belt moves laterally on the drive sheave and relative to the magnetic sensor, the plurality of signal channels are activated in succession and indicate a direction of lateral movement of the elevator belt on the drive sheave.

In another aspect of the present disclosure, a method of monitoring a position of an elevator belt reeved on an elevator drive sheave includes producing a magnetic field in proximity to the elevator belt; and monitoring lateral movement of the elevator belt on the drive sheave with a magnetic sensor located in operational proximity to the drive sheave carrying the elevator belt, the magnetic sensor including a plurality of signal channels spaced apart along a width of the magnetic sensor, wherein the respective signal channels are activated by the proximity of the elevator belt to the signal channels as the elevator belt passes through the magnetic field generated by the magnetic field producer to determine a lateral position of the elevator belt on the drive sheave.

Further aspects will now be described in the following numbered clauses.

Clause 1: An elevator belt position tracking system, comprising a magnetic field producer located in operational proximity to an elevator sheave carrying an elevator belt to produce a magnetic field encompassing the elevator belt, a magnetic sensor located in operational proximity to the sheave carrying the elevator belt, the magnetic sensor comprising a plurality of signal channels spaced apart along a width of the magnetic sensor, wherein the respective signal channels are activated by the proximity of the elevator belt to the signal channels as the elevator belt passes through the magnetic field generated by the magnetic field producer to determine a lateral position of the elevator belt on the sheave.

Clause 2: The elevator belt position tracking system as claimed in Clause 1, further comprising a belt position calculating unit used to determine the lateral position of the elevator belt on the sheave.

Clause 3: The elevator belt position tracking system as claimed in Clause 1 or Clause 2, further comprising a notification device to receive an output of the belt position calculating unit, the notification device being configured to inform a user of the lateral position of the elevator belt on the sheave.

Clause 4: The elevator belt position tracking system as claimed in any of Clauses 1-3, wherein the notification device is configured to output an alert indication when the elevator belt has activated an outermost signal channel on the magnetic sensor or when the elevator belt has activated a signal channel located to the left or to the right of a sheave lateral center point by about 95%-105% of the width of the elevator belt.

Clause 5: The elevator belt position tracking system as claimed in any of Clauses 1-4, wherein the notification device comprises at least one of the following: a display, a remote monitoring station, a mobile device, an elevator car controller, and a master controller of an elevator system.

Clause 6: The elevator belt position tracking system as claimed in any of Clauses 1-5, wherein the width of the magnetic sensor is greater than a width of the elevator belt.

Clause 7: The elevator belt position tracking system as claimed in any of Clauses 1-6, wherein the width of the magnetic sensor is at least as wide as a width of a respective section of the sheave.

Clause 8: The elevator belt position tracking system as claimed in any of Clauses 1-7, wherein the magnetic sensor is a giant magneto-resistance sensor.

Clause 9: The elevator belt position tracking system as claimed in any of Clauses 1-8, wherein, as the elevator belt moves laterally on the sheave and relative to the magnetic sensor, the plurality of signal channels are activated in succession and indicate a direction of lateral movement of the elevator belt on the sheave.

Clause 10: An elevator system, comprising an elevator car, an elevator belt attached to the elevator car and reeved on an elevator drive sheave to move the elevator car through a hoistway, a hoist motor operatively connected to the drive sheave to rotate the drive sheave, and an elevator belt position tracking system, comprising a magnetic field producer located in operational proximity to the drive sheave carrying the elevator belt to produce a magnetic field encompassing the elevator belt, a magnetic sensor located in operational proximity to the drive sheave carrying the elevator belt, the magnetic sensor comprising a plurality of signal channels spaced apart along a width of the magnetic sensor, wherein the respective signal channels are activated by the proximity of the elevator belt to the signal channels as the elevator belt passes through the magnetic field generated by the magnetic field producer to determine a lateral position of the elevator belt on the drive sheave.

Clause 11: The elevator system as claimed in Clause 10, wherein the elevator belt comprises at least one internal magnetic component.

Clause 12: The elevator system as claimed in Clause 10 or Clause 11, further comprising a belt position calculating unit used to determine the lateral position of the elevator belt on the drive sheave.

Clause 13: The elevator system as claimed in any of Clauses 10-12, further comprising a notification device to receive an output of the belt position unit, the notification device being configured to inform a user of the lateral position of the elevator belt on the drive sheave.

Clause 14: The elevator system as claimed in any of Clauses 10-13, wherein the notification device is configured to output an alert indication when the elevator belt has activated an outermost signal channel on the magnetic sensor or when the elevator belt has activated a signal channel located to the left or to the right of a sheave lateral center point by about 95%-105% of the width of the elevator belt.

Clause 15: The elevator system as claimed in any of Clauses 10-14, wherein the notification device comprises at least one of the following: a display, a remote monitoring station, a mobile device, an elevator car controller, and a master controller of the elevator system.

Clause 16: The elevator system as claimed in any of Clauses 10-15, wherein the width of the magnetic sensor is greater than a width of the elevator belt.

Clause 17: The elevator system as claimed in any of Clauses 10-16, wherein the width of the magnetic sensor is at least as wide as a width of the respective drive sheave section.

Clause 18: The elevator system as claimed in any of Clauses 10-17, wherein the magnetic sensor is a giant magneto-resistance sensor.

Clause 19: The elevator system as claimed in any of Clauses 10-18, wherein, as the elevator belt moves laterally on the drive sheave and relative to the magnetic sensor, the plurality of signal channels are activated in succession and indicate a direction of lateral movement of the elevator belt on the drive sheave.

Clause 20: A method of monitoring a position of an elevator belt reeved on an elevator drive sheave, comprising producing a magnetic field in proximity to the elevator belt; and monitoring lateral movement of the elevator belt on the drive sheave with a magnetic sensor located in operational proximity to the drive sheave carrying the elevator belt, the magnetic sensor comprising a plurality of signal channels spaced apart along a width of the magnetic sensor, wherein the respective signal channels are activated by the proximity of the elevator belt to the signal channels as the elevator belt passes through the magnetic field generated by the magnetic field producer to determine a lateral position of the elevator belt on the drive sheave.

These and other features and characteristics of the elevator belt position tracking system, as well as the methods of operation and functions of the related elements of the system, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and claims, the singular form of "a", "an", and "the" include plural referents unless the context clearly dictates otherwise.

DESCRIPTION OF THE DISCLOSURE

Figure 1:
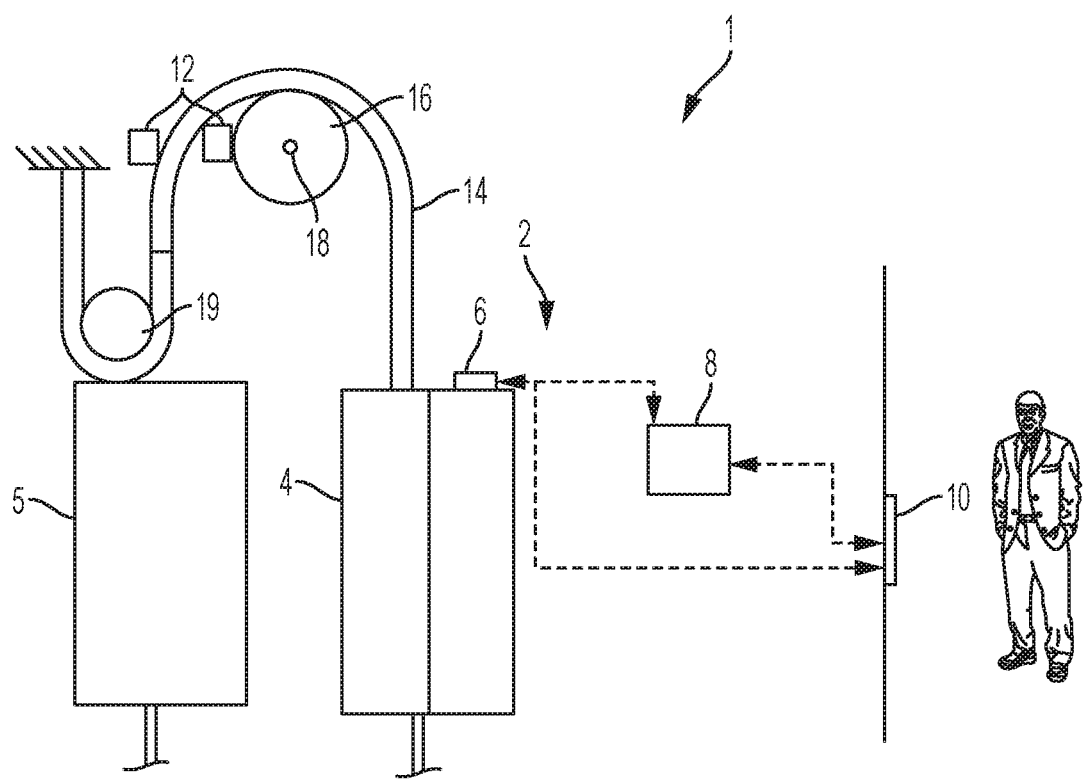
FIG. 1 is a schematic drawing of an elevator system according to one example of the present disclosure.

For purposes of the description hereinafter, the terms "upper", "lower", "right", "left", "vertical", "horizontal", "top", "bottom", "lateral", "longitudinal", and derivatives thereof, shall relate to the invention as it is oriented in the figures. However, it is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

As used herein, the terms "communication" and "communicate" refer to the receipt, transmission, or transfer of one or more signals, messages, commands, or other types of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, encrypted, processed, routed, etc., between the first and second unit or device. It will be appreciated that numerous arrangements are possible. Any known electronic communication protocols and/or algorithms may be used such as, for example, UDP, TCP/IP (including HTTP and other protocols), WLAN (including 802.11 and other radio frequency-based protocols and methods), analog transmissions, cellular networks, and/or the like.

Referring to the drawings in which like reference numerals refer to like parts throughout the several views thereof, the present disclosure is generally directed to an elevator belt position tracking system for an elevator system and, more particularly, to an elevator belt position tracking system configured to monitor an integrity of an elevator belt and to track a position of the elevator belt on a sheave.

Referring to FIG. 1, an elevator system 1 having an elevator control system 2 is described. The elevator system 1 is shown with a first elevator car 4 and a tension unit 5. In one example, the elevator system 1 may include a single elevator car or multiple elevator cars. The elevator car(s) 4 may move through a building in a vertical direction (y-axis), a left-right direction (x-axis), a front-rear direction (z-axis), or any multi-dimensional direction vector within the building. The elevator car(s) 4 may move through the building using any method that is known in the art or future-developed for moving an elevator car 4 in an elevator system 1. In one example, at least one elevator belt 14 operatively connects to and extends between the first elevator car 4 and the tension unit 5 which comprises a second elevator car 4. In another example, at least one elevator belt 14 operatively connects the elevator car 4 to the tension unit 5, which comprises a counterweight. In one example, a plurality of elevator belts 14 are used to translate the elevator car(s) 4 through the hoistway. Each elevator belt 14 is directed over a drive sheave 16 provided in the hoistway through which the elevator cars 4 are moved. The drive sheave 16 is operated by a hoist motor 18 to raise and lower the elevator cars 4 within the hoistway. In one example, the elevator system 1 further comprises one or more deflector sheaves 19 mounted to a hoistway wall or to the elevator car. The plurality of elevator belts 14 may be directed either over or under the deflector sheaves 19.

Figure 4:
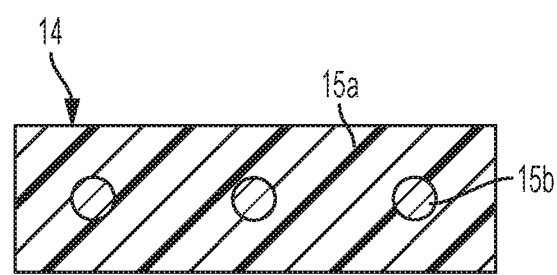
FIG. 4 is a cross-sectional view of an elevator belt used with the elevator system of FIG. 1.

The tension unit 5, such as a counterweight, is provided for creating tension in the elevator belt(s) 14. The tension that is created provides a degree of travel control of the elevator belt(s) 14 to control the travel of the elevator car 4. While the tension can be created by a passive weight system, such as a second elevator car 4 or a counterweight, the tension can also be created by a mechanical tensioning system such as a spring system or a high traction system with grooved belt and spool designs. Further, while the present disclosure describes the use of an elevator belt(s) 14 to translate the elevator cars 4 through the hoistway, a load bearing member or rope encased in a common coating could also be used with the elevator system 1. As show in FIG. 4, the elevator belt(s) 14 may be made of a plurality of magnetic load bearing members 15b coated with a polyurethane material or some other envelope or matrix material. In another example, the elevator belt(s) 14 may be made of a plurality of load bearing members 15b coated with a magnetic material. An outer jacket 15a may be provided to encase the load bearing members 15b therein.

An elevator car controller 6 is provided on the elevator car 4. In other embodiments, the elevator car controller 6 may be located remotely from the elevator car 4, for example, in the hoistway wall. The elevator car controller 6 may be used to communicate with other components of an elevator control system 2. In one example, the elevator car controller 6 may be a controller that is part of a control panel, such as a microprocessor, a microcontroller, a central processing unit (CPU), and/or any other type of computing device. However, additional control systems or components that direct information through signals to other control systems may also be used for the elevator car controller 6. The elevator car controller 6 may be in wireless communication with a master controller 8. The master controller 8 may receive and/or communicate information from the elevator car controller 6 regarding the current position of the elevator car 4 and/or the travel rate of the elevator car 4, among other information regarding the elevator car 4. In one example, the master controller 8 may be a controller that is part of a control panel, such as a microprocessor, a microcontroller, a CPU, and/or any other type of computing device. The master controller 8 may be in wired and/or wireless communication with each separate elevator car 4 included in the elevator system 1. It is also contemplated that the master controller 8 may be the elevator car controller 6 or may be housed in one of the elevator cars 4 of the elevator system 1. The master controller 8 may be in wired and/or wireless communication with at least one user interface 10 provided at one or more of a plurality of loading stations within the building for users to enter and exit the elevator car 4. In one example, the user interface 10 may be a control panel or similar display that allows a user to select a desired destination and route within the building. The user interface 10 may include a CPU or other controller in wireless communication with the master controller 8. Information from the master controller 8 regarding the elevator car 4 may be received by the user interface 10. It is also contemplated that each elevator car controller 6 may be in wireless communication with the user interface 10. Each elevator car controller 6 may transmit information regarding the elevator car 4 directly to the user interface 10.

Figure 2:
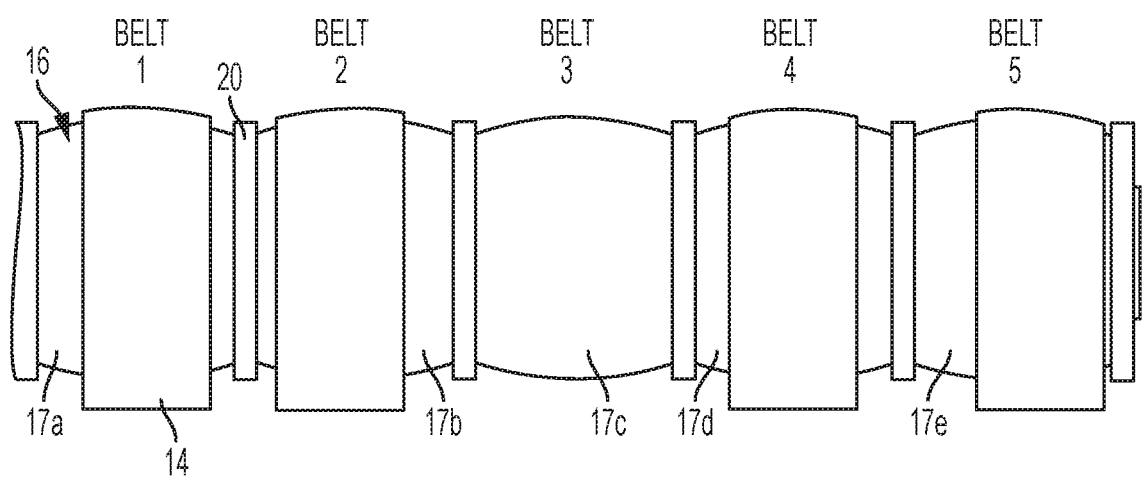
FIG. 2 is a front view of an elevator sheave having a plurality of individual sheaves and a plurality of elevator belts on the sheaves used in the elevator system of FIG. 1.

Analyzing the structural integrity, remaining life, and the position of an elevator belt(s) 14 is a function of the safe operation of the elevator system 1. Integrity degradation of an elevator belt 14 results from cyclic bending around the sheaves 16, 19 when the elevator car(s) 4 are translated through the hoistway. Integrity degradation of the elevator belt 14 may also be increased due to the off-center positioning of the elevator belt 14 on the sheaves 16, 19. As shown in FIG. 2, when using, for example, a crowned drive sheave 16 in an elevator system 1, the elevator belt(s) 14 may move laterally (left or right) from the center of the drive sheave 16. In one example, the crowned drive sheave 16 includes a plurality of sheave sections 17a-17e that extend across the width of the drive sheave 16. In one example, an elevator belt 14 is reeved on each sheave section 17a-17e. As the elevator belt(s) 14 moves left or right, the elevator belt(s) 14 may come in contact with a raised flange or border 20 on the drive sheave 16. The first elevator belt of FIG. 2 is shown in an off-center position to the right in the sheave section 17a. The second elevator belt is shown in an off-center position to the left in the sheave section 17b. The fifth elevator belt is shown in an off-center position to the right in the sheave section 17e with the fifth elevator belt contacting the border 20 of the sheave section 17e. This movement of the elevator belt(s) 14 can cause in-balance in the elevator system 1 leading to damage of the elevator belt(s) 14, un-equal tension in the elevator belt(s) 14, alignment issues with the elevator belt(s) 14, and/or increased fleet angle due to defects or system settlement over time. When the elevator belt(s) 14 is/are not centered on the drive sheave 16 and is/are running against the border 20, a belt destroying effect is experienced that can affect the integrity of the elevator belt(s) 14.

Figure 3:
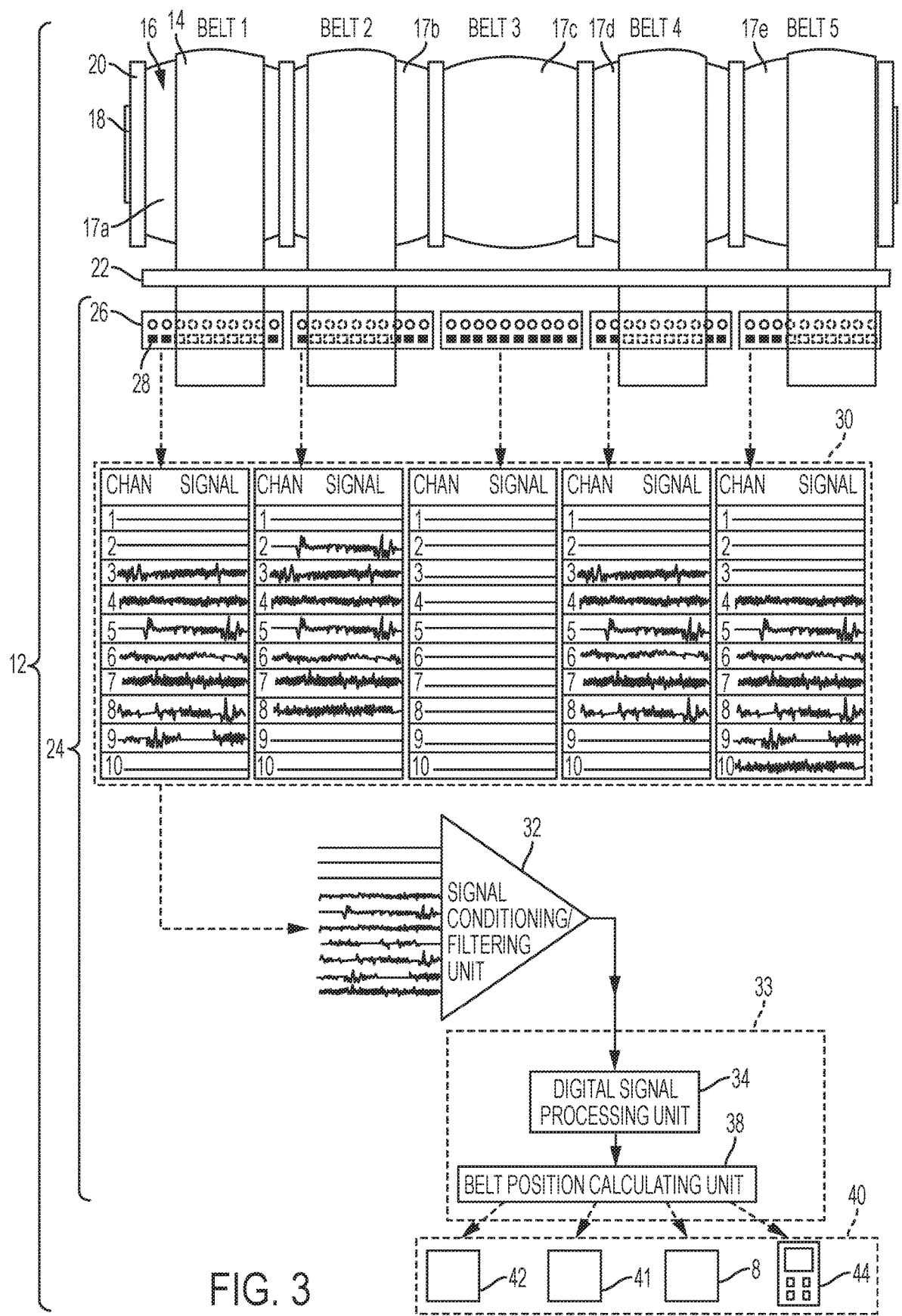
FIG. 3 is a schematic view of an elevator belt position tracking system for use with the elevator system of FIG. 1.

With this belt destroying effect in mind, the elevator belt(s) 14 can be monitored for integrity degradation and misalignment on the drive sheave 16. Visual inspection methods for monitoring elevator belts 14 can be limited by an outer portion or coating on the elevator belt(s) 14. The inner load bearing members 15b of the elevator belt(s) 14 may experience damage that is not detectable with a visual inspection of the elevator belt(s) 14. With reference to FIG. 3, an elevator belt position tracking system 12 (hereinafter "system 12") is provided in the elevator control system 2 for (1) monitoring an integrity of the elevator belt(s) 14 and (2) tracking a position of the elevator belt(s) 14 relative to the drive sheave 16 of the elevator system 1. The system 12 includes a magnetic field producer 22 and a magnetic sensor 24. In one example, the magnetic sensor 24 is a giant magneto-resistance sensor (GMR) unit 24.

The elevator belt position tracking system 12 is arranged such that the elevator belts 14, reeved on each sheave section 17a-17e of the drive sheave 16, move relative to the magnetic field producer 22 and the GMR sensor unit 24. The magnetic field producer 22 and GMR sensor unit 24 are positioned in operational proximity to the elevator belt(s) 14. In one example, operational proximity is understood to be a minimum distance from the elevator belt(s) 14 whereby each elevator belt 14 positioned on the drive sheave 16 is sufficiently encompassed within a magnetic field generated by the magnetic field producer 22 and operationally interacts with the GMR sensor unit 24 to detect the presence of the elevator belt(s) 14 relative to the GMR sensor unit 24. In one example, encompassed is understood to mean that the magnetic field generated by the magnetic field producer 22 surrounds and/or penetrates the elevator belt(s) 14. In one example, the magnetic field producer 22 is positioned on one side of the elevator belt(s) 14 and the GMR sensor unit 24 is positioned on an opposing side of the elevator belt(s) 14. A magnetic field is produced by the magnetic field producer 22 adjacent or in operational proximity to the elevator belt(s) 14. A metal plate provided in the magnetic field producer 22 operates as a magnetic conductor to complete a magnetic flux loop of the magnetic field producer 22 to encompass the elevator belt(s) 14.

During operation, the hoist motor 18 is activated to rotate the drive sheave 16 in either a clockwise or counterclockwise direction. As the drive sheave 16 is rotated, the elevator belt(s) 14 reeved on the drive sheave 16 are moved within the hoistway to move the elevator cars 4 through the hoistway. As the elevator belt(s) 14 are moved by the rotation of the drive sheave 16, the elevator belt(s) 14 move relative to the magnetic field producer 22 and the GMR sensor unit(s) 24. The elevator belt(s) 14 are moved through the magnetic field generated by the magnetic field producer 22 causing the magnetic load bearing members 15b in the elevator belt(s) 14 to interact with the magnetic field.

The GMR sensor unit 24 is configured to detect the presence of the elevator belt(s) 14 within the magnetic field generated by the magnetic field producer 22. The GMR unit 24 is also desirably configured to monitor the integrity of the elevator belt(s) 14. In one example, the GMR unit 24 includes an array of GMR sensors 26. The array provides a single GMR sensor 26 positioned relative to each elevator belt 14 on the drive sheave 16. In another example, the GMR unit 24 is a single GMR sensor 26 configured to monitor and track the position of all of the elevator belts 14.

With continued reference to FIG. 3, the GMR unit 24 is desirably configured to detect the relative position of the elevator belt(s) 14 on the drive sheave 16. The GMR sensor unit 24 will obtain a reading merely indicating the presence of the elevator belt(s) 14 on the drive sheave 16 based on the interaction of magnetic load bearing members 15b of the elevator belt(s) 14 with the magnetic field generated by the magnetic field producer 22. Using the GMR sensor unit 24 to detect the presence of the elevator belt(s) 14 on the drive sheave 16, the GMR unit 24 tracks the lateral position of the elevator belt(s) 14 relative to the drive sheave 16 and/or the GMR unit 24. Each GMR sensor 26 includes several signal channels 28 that detect and record the presence or absence of the magnetic field in the respective elevator belt 14. Based on the position of the elevator belt 14 relative to the respective signal channels 28 of the GMR sensor 26, the GMR sensor 26 is capable of determining whether the elevator belt(s) 14 has moved laterally off-center on the particular section 17a-17e of the drive sheave 16. To determine movement of the elevator belt(s) 14 relative to the drive sheave 16 and/or the GMR sensor 26, each GMR sensor 26 may have a width greater than the elevator belt(s) 14. In one example, the signal channels 28 are spaced apart along a width of the GMR sensor 26 such that the combined width of the total number of signal channels 28 is greater than the width of the elevator belt(s) 14. In one example, the combined width of the total number of signal channels 28 is substantially equal to the width of a drive sheave section 17a-17e. While FIG. 3 depicts ten signal channels in each GMR sensor 26, it is also contemplated that additional or fewer signal channels may be included in the GMR sensor 26, provided that the total width of all of the signal channels in the GMR sensor 26 is greater than the total width of the elevator belt(s) 14. It is also contemplated that the width of the total number of signal channels 28 can be equal to or less than the width of the elevator belt(s) 14. In one example, the left-most and the right-most signal channels 28 on the GMR sensor 26 correspond to the left border 20 and right border 20 of the respective sheave section 17a-17e. Therefore, when the elevator belt(s) 14 has/have moved on the drive sheave 16 so as to contact one of the borders 20, the respective outermost signal channel 28 of the GMR sensor 26 will be activated, indicating that maintenance of the elevator system 1 is required to return the elevator belt(s) 14 back to its/their center position.

Based on the position of the elevator belt(s) 14 relative to the signal channels 28 of the GMR sensor 26, the GMR unit 24 is configured to detect when the elevator belt(s) 14 has/have moved laterally on the drive sheave 16. For example, the fourth elevator belt 14 in FIG. 3 is positioned at the center position on the respective section 17d of the drive sheave 16. The six middle signal channels 28 of the GMR sensor 26 are activated to indicate that the elevator belt(s) 14 is/are in the center position. As the elevator belt(s) 14 moves/move laterally left or right on the drive sheave 16, new signal channels 28 on the GMR sensor 26 will be activated, while other signal channels 28 will be deactivated. For example, the second elevator belt 14 in section 17b has moved laterally to the left on the sheave section 17b of the drive sheave 16. Due to this right-to-left movement of the elevator belt 14, at least one of the signal channels 28 on the right-hand side of the GMR sensor 26 has been deactivated and at least one new signal channel 28 on the left-hand side of the GMR sensor 26 has been activated. In another example, the first elevator belt 14 in section 17a has moved laterally to the right on the sheave section 17a of the drive sheave 16. Due to this left-to-right movement of the elevator belt 14, at least one of the signal channels 28 on the left-hand side of the GMR sensor 26 has been deactivated and at least one new signal channel 28 on the right-hand side of the GMR sensor 26 has been activated. In a further example, the fifth elevator belt 14 in section 17e has moved laterally so far right on the sheave section 17e of the sheave drive 16 as to contact the border 20 of the drive sheave 16, which can lead to degradation and misalignment of the elevator belt 14 on the drive sheave 16. Due to the left-to-right movement of the fifth elevator belt 14, at least one signal channel 28 on the left-hand side of the GMR sensor 26 has been deactivated and the right-most signal channel 28 on the right-hand side of the GMR sensor 26 has been activated.

Based on the deactivation and activation of certain signal channels 28, each GMR unit 24 is configured to determine the lateral movement of the elevator belt(s) 14 on the drive sheave 16. The activation and deactivation of the respective signal channels 28 of each GMR sensor 26 is monitored and recorded signals 30 are transmitted to a computing unit 33, as shown in FIG. 3. The signals 30 record the activation/deactivation of each respective signal channel 28 of the GMR sensors 26 and can be utilized to determine the position of the elevator belt(s) 14 on the drive sheave 16. When a signal channel 28 is deactivated, no or little signal 30 is recorded for that signal channel 28. When a signal channel 28 is activated, a signal 30 is recorded and transmitted for that signal channel 28. In some examples, signals 30 are directed from the GMR sensor 26 to a signal conditioning unit 32 before being directed to the computing unit 33. The signal conditioning unit 32 may filter out noise or glitches in the signal 30 contributed by other elevator components, such as the hoist motor 18.

Signals 30 are directed through computing unit 33 which contains one or more of: a digital signal processing unit 34 and a belt position calculating unit 38. In one example, the digital signal processing unit 34 integrates all of the signals 30 from each belt 14 to create integrated signals 30'. An algorithm may be used to determine the belt position based on the combinations and levels of signals 30 entering the digital signal processing unit 34.

Once the signals have passed through the digital signal processing unit 34 and/or the filtering unit 36, a belt position calculating unit 38 receives the signals 30 to determine an absolute belt position of the elevator belt(s) 14 on the drive sheave 16. In one example, the belt position calculating unit 38 utilizes the integrated signals 30' to determine a positon of the respective elevator belt 14 on the respective drive sheave section 17a-17e. This processing could be done with a dedicated processor on the GMR unit 24, in the elevator controller 6, or at a remote monitoring unit. In one example, the belt position calculating unit 38 determines that the elevator belt(s) 14 has/have moved off-center on the drive sheave 16 and sends a warning or alarm to a notification device 40 comprising one or more of: the elevator car controller 6, the master controller 8, a display 41, a remote monitoring station 42, a mobile device 44, requiring one or more of: maintenance or inspection of the elevator system 1, altering the tension of the elevator belt(s) 14 with actuator(s) (not shown) located at each elevator belt termination, inducing magnetic force into the elevator belt(s) 14 or the drive sheave 16 to reposition the elevator belt(s) 14, slow down the elevator car 4, shut down the elevator system 1, and communicate with other elevator system sensors (not shown) to find a cause. In one example, the belt position calculating unit 38 determines a specific distance between the elevator belt(s) 14 and the borders 20 of the respective sheave sections 17a-17e. Using this specific distance, the belt position calculating unit 38 determines how close the elevator belt(s) 14 is/are to one of the borders 20 of the respective sheave sections 17a-17e. Based on this determined distance, the belt position calculating unit 38 can determine whether a warning or an alarm needs to be sent.

Figure 5A:
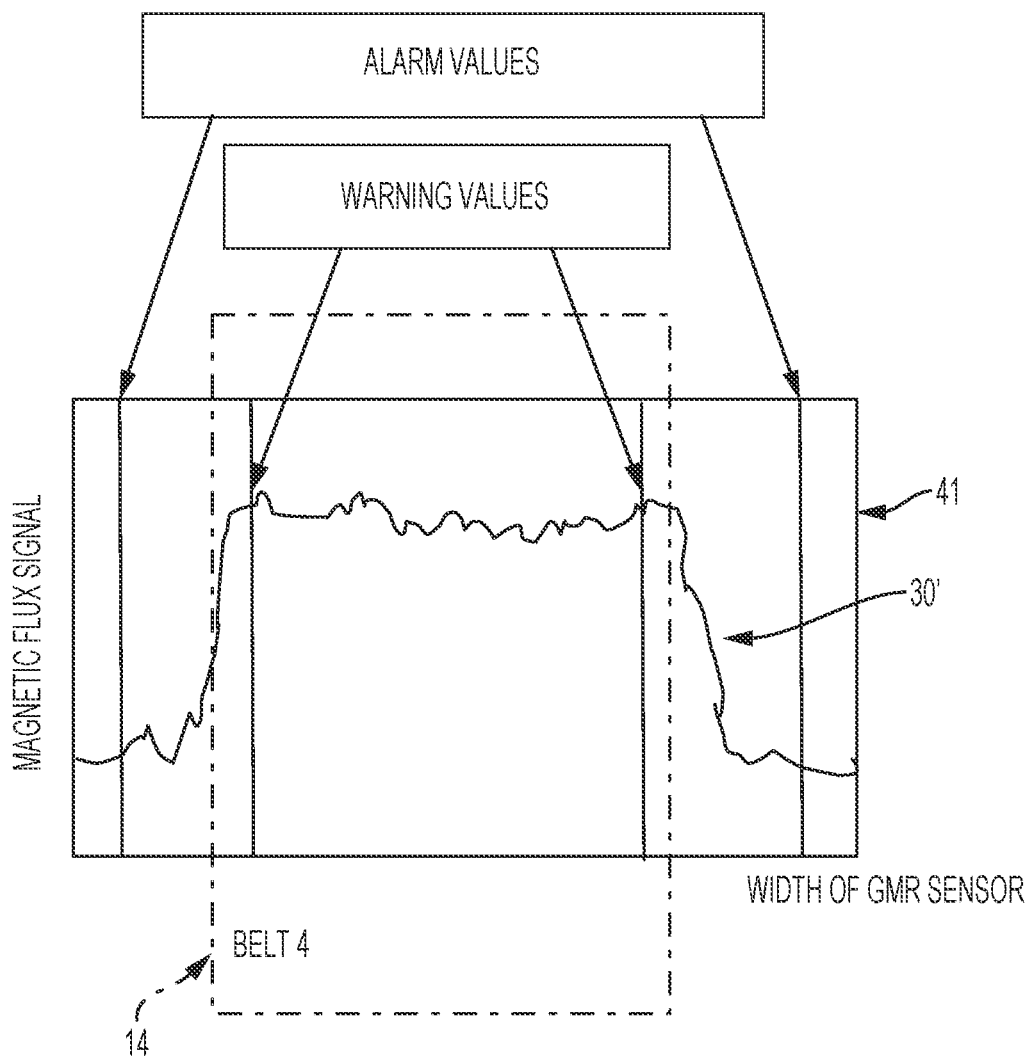
FIG. 5A is an example integrated signal for an elevator belt in a centered position on an individual sheave of FIG. 2.
Figure 5B:
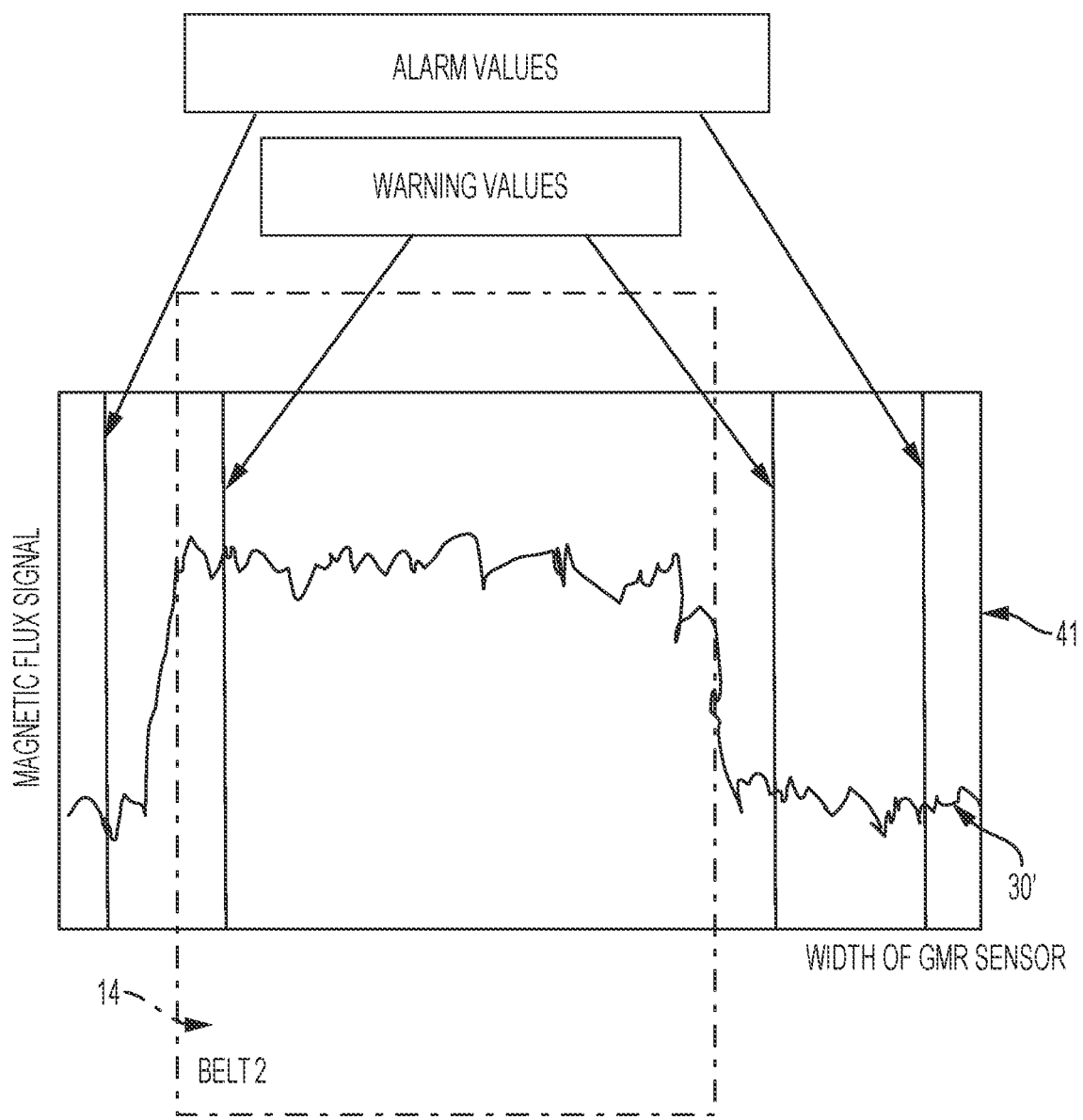
FIG. 5B is an example integrated signal for an elevator belt in an off-center to the left position on an individual sheave of FIG. 2.
Figure 5C:
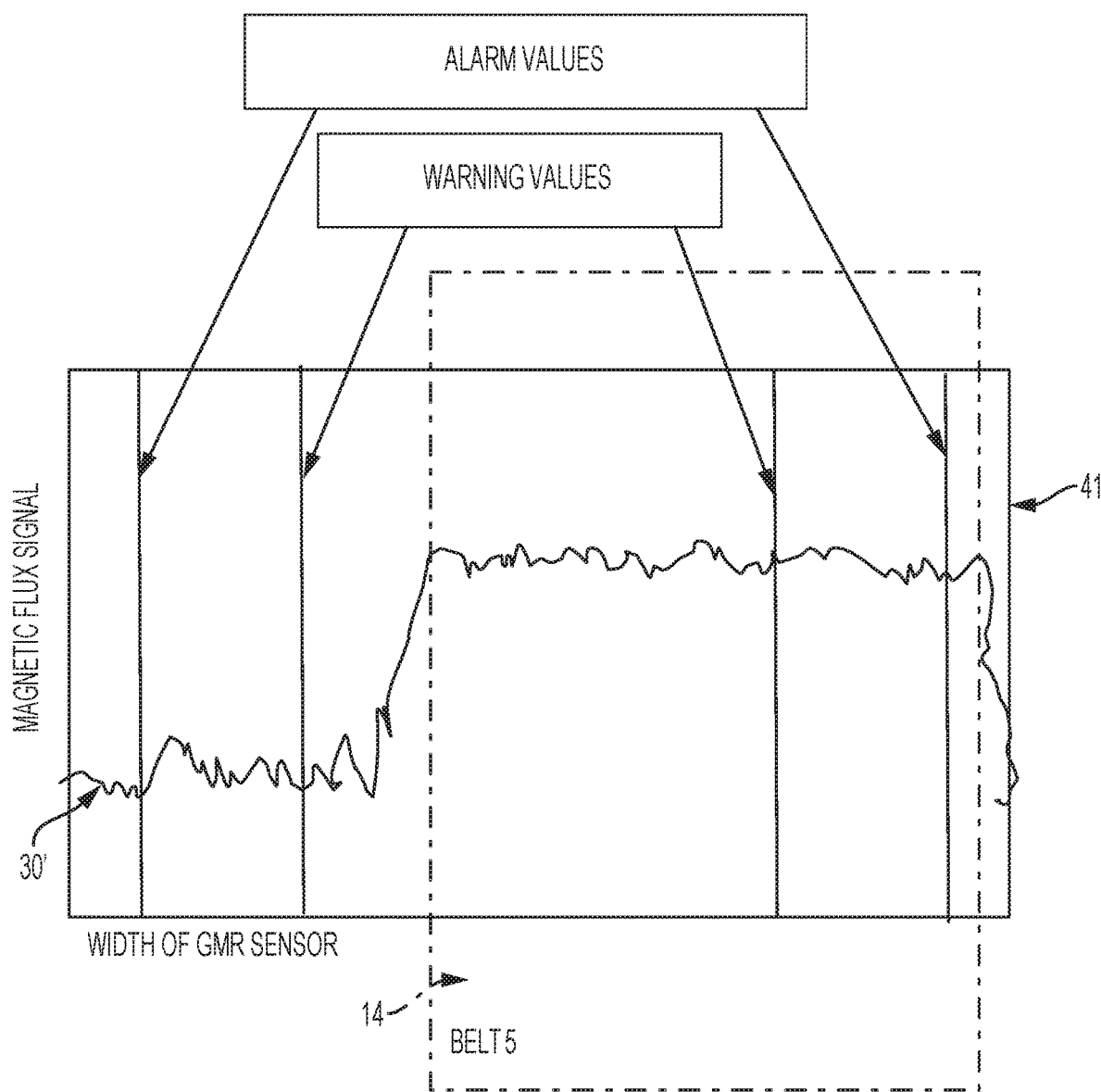
FIG. 5C is an example integrated signal for an elevator belt in an extreme off-center to the right position on an individual sheave of FIG. 2.

FIGS. 5A-5C depict use cases of how the belt position calculating unit 38 determines the need to send a warning or an alarm. The belt position calculating unit 38 overlays a predetermined left alarm marker, right alarm marker, left warning marker, and right alarm marker with the integrated signal 30' of the elevator belt 14. The positions of the predetermined markers depend on parameters such as belt structure, belt width, sheave diameter, sheave width, and crown height. In one example, the left alarm marker is set to the left of the drive sheave section lateral center point by about 35%-40% the belt width, and, ideally, by about 37.5% the belt width. The right alarm marker is set to the right of the drive sheave section lateral center point by about 35%-40% the belt width, and, ideally, about 37.5% the belt width. In another example, the left alarm marker is set to the left of the drive sheave section lateral center point by about 95%-105% the belt width, and, ideally, by about 100% the belt width. The right alarm marker is set to the right of the drive sheave section lateral center point by about 95%-105% the belt width, and, ideally, by about 100% the belt width. In FIG. 5A, the elevator belt 14 is centered on the drive sheave section 17d. Both the left warning maker and the right warning marker have a high signal reading. Both the left alarm marker and right alarm marker have a low signal reading. This reading indicates that at least about 75% of the elevator belt 14 is considered centered on the drive sheave section 17d. The belt position calculating unit 38 can store this normal operation information and/or send the normal operation information to the notification device 40 comprising one or more of: the elevator car controller 6, the master controller 8, the display 41, the remote monitoring station 42, and the mobile device 44. In FIG. 5B, the elevator belt 14 is off center to the left on the drive sheave section 17b. The left warning marker has a high signal, the right warning marker has a low signal, and the left and right alarm markers have low signals. In some examples, the belt position calculating unit 38 may immediately send a warning when one warning marker has a low signal. In other examples, the belt position calculating unit 38 will allow a low signal on one warning marker for a preset run-time before sending a warning, thereby allowing for a small amount of lateral play of the elevator belt 14 on the drive sheave 16. In still other examples, the belt position calculating unit 38 will only allow a change from a low signal on a warning value back to a high signal on the warning value for a predetermined number of times before sending a warning signal. In one example shown in FIG. 5B, belt position calculating unit 38 sends a warning signal that triggers one or more of the following: the actuator to change tension of the elevator belt 14, a maintenance call for inspection of the elevator belt 14, and communication with system sensors to specify more detailed causes of the lateral play of the elevator belt 14. In FIG. 5C, the elevator belt 14 is extremely off center to the right on drive sheave section 17e. The right alarm marker has a high signal, the right warning marker has a high signal, the left alarm marker has a low signal, and the left warning marker has a low signal. The elevator belt 14 is considered to have an unacceptable amount alignment and/or lateral play. The belt position calculating unit 38 may immediately send an alarm signal when one alarm marker has a high signal. In one example shown in FIG. 5C, the belt position calculating unit 38 sends an alarm signal that triggers one or more of the following: a maintenance call for inspection of the elevator belt 14, slow down of the elevator car 4, shut down of the elevator car 4, modified operation of the elevator system 1 such that the elevator car 4 only travels in areas the result is acceptable integrated signal 30' readings, and communication with system sensors to specify more detailed causes of the lateral play of the elevator belt 14.

Once the belt position calculating unit 38 has determined the position of the elevator belt(s) 14 on the drive sheave 16, a notification device 40 is configured to generate an output regarding the position of the elevator belts(s) 14. In one example, the notification device 40 comprises one display 41 for each GMR sensor 26 that continuously depicts all markers and the integrated signal 30' graphically, as shown in FIGS. 5A-5C. In one example, in which the elevator belt(s) 14 is/are centered, the notification device 40 will generate an output indicating that this elevator belt 14 is centered based on the normal operation information. It is also contemplated that an output from the notification device 40 will not be generated until the elevator belt(s) 14 has/have moved laterally from the center position. In another example in which the elevator belt(s) 14 has/have moved off-center on the drive sheave 16, the notification device 40 will generate an output indicating that the elevator belt(s) 14 has/have moved either left or right on the drive sheave 16 based on warning signal or alarm signal information. In several examples, the normal operation information, warning signal information and/or alarm signal information is alternatively/additionally sent to at least one of: (1) the remote monitoring station 42 located separate from the elevator system 1, (2) the master controller 8 of the elevator system 1, (3) the elevator car controller 6, or (4) the output is sent to a mobile device 44 carried by an individual tasked with monitoring the maintenance of the elevator system 1. In another example, the output may be stored in an Application Programming Interface (API) to allow any individual to retrieve the output information from the notification device 40. The mobile device 44 may be a smartphone, a tablet, a laptop computer, a watch, a personal digital assistant (PDA), or any other device that is typically carried by an individual or maintenance personnel. The output, warning signal information, and/or alarm signal information may include the activation of an indicator light, a digital representation of the position of the elevator belt(s) 14 on the drive sheave 16, a numeral value indicating the distance the elevator belt(s) 14 has/have moved off-center, or an audible indicator that the elevator belt(s) 14 has/have moved to an off-center position. In one example, the notification device 40 is configured to continuously monitor the position of the elevator belt(s) 14 on the drive sheave 16 to determine when the elevator belt(s) 14 has/have moved on the drive sheave 16. In another example, the notification device 40 is configured to periodically monitor the position of the elevator belt(s) 14 on the drive sheave 16. The notification device 40 may be configured to monitor the position of the elevator belt(s) 14 once a day, twice a day, every hour, every half hour, or any other period of time as desired to determine when the elevator belt 14 has/have moved.

In one example, the magnetic field generated by the magnetic field producer 22 leaks or deviates from a standard magnetic field path created with the magnetic loading bearing members 15b of the elevator belt(s) 14 when an irregularity or localized flaw site on the elevator belt(s) 14 interacts with the magnetic field generated by the magnetic field producer 22. In one example, the magnetic field generated by the magnetic field producer 22 is configured to penetrate the entire depth of the elevator belt(s) 14. Flaws or damage to any magnetic portion of the elevator belt(s) create variations within the magnetic field, which are detectable by the GMR sensors 26 of the GMR unit 24. The GMR unit 24 can detect the variations in the magnetic field when the elevator belt(s) 14 is stationary or moving. The GMR unit 24 is configured to record the irregularity in the magnetic field to allow an individual to locate the irregularity in the elevator belt(s) 14 at a later date during inspection. In one example of the present disclosure, the GMR unit 24 identifies irregularities in the elevator belt(s) 14 along the elevator belt(s)'s 14 length, width, and depth. Irregularities can include diameter diminution of cables or wires, broken wires due to fretting wear and stress fatigue, holes, voids, roughing, corrosion, fractures, deformation, and/or manufacturing defects. The system 12 is configured to detect and determine a degree of irregularity or damage in the elevator belt(s) 14. Based on a detection of irregularities in the elevator belt(s) 14, targeted inspections of the particular irregularity reduces the amount of routine inspection necessary for identifying defects or damage in the elevator belt(s) 14.

While several examples of the elevator belt position tracking system are shown in the accompanying figures and described in detail hereinabove, other aspects will be apparent to, and readily made by, those skilled in the art without departing from the scope and spirit of the disclosure. For example, while the description above and FIG. 1 refer to elevator belt monitoring on the drive sheave 16, it is also contemplated that the elevator belt(s) 14 could be monitored on the deflector sheave 19. Further, while the above description is directed to a crowned sheave, it is also contemplated that the elevator belt tracking concept could be used on a flat sheave. It is also contemplated that the belt position calculating unit 38 could consider belt degradation information when sending belt tracking warning and alarms. For example, if the GMR readings of the elevator belt 14 indicated that the elevator belt 14 is showing signs of defects, the belt position calculating unit 38 could immediately trigger an alarm instead of allowing further readings. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. An elevator belt position tracking system, comprising:
a magnetic field producer located in operational proximity to an elevator sheave carrying an elevator belt to produce a magnetic field encompassing the elevator belt;
a magnetic sensor located in operational proximity to the sheave carrying the elevator belt, the magnetic sensor comprising a plurality of signal channels spaced apart along a width of the magnetic sensor,
wherein the respective signal channels are activated by the proximity of the elevator belt to the signal channels as the elevator belt passes through the magnetic field generated by the magnetic field producer to determine a lateral position of the elevator belt on the sheave.

2. The elevator belt position tracking system as claimed in claim 1, further comprising a belt position calculating unit used to determine the lateral position of the elevator belt on the sheave.

3. The elevator belt position tracking system as claimed in claim 2, further comprising a notification device to receive an output of the belt calculating position unit, the notification device being configured to inform a user of the lateral position of the elevator belt on the sheave.

4. The elevator belt position tracking system as claimed in claim 3, wherein the notification device is configured to output an alert indication when the elevator belt has activated an outermost signal channel on the magnetic sensor or when the elevator belt has activated a signal channel located to the left or to the right of a sheave lateral center point by about 95%-105% of the width of the elevator belt.

5. The elevator belt position tracking system as claimed in claim 3, wherein the notification device comprises at least one of the following: a display, a remote monitoring station, a mobile device, an elevator car controller, and a master controller of an elevator system.

6. The elevator belt position tracking system as claimed in claim 1, wherein the width of the magnetic sensor is greater than a width of the elevator belt.

7. The elevator belt position tracking system as claimed in claim 1, wherein the width of the magnetic sensor is at least as wide as a width of a respective section of the sheave.

8. The elevator belt position tracking system as claimed in claim 1, wherein the magnetic sensor is a giant magneto-resistance sensor.

9. The elevator belt position tracking system as claimed in claim 1, wherein, as the elevator belt moves laterally on the sheave and relative to the magnetic sensor, the plurality of signal channels are activated in succession and indicate a direction of lateral movement of the elevator belt on the sheave.

10. An elevator system, comprising:
an elevator car;
an elevator belt attached to the elevator car and reeved on an elevator drive sheave to move the elevator car through a hoistway;
a hoist motor operatively connected to the drive sheave to rotate the drive sheave; and
an elevator belt position tracking system, comprising:
a magnetic field producer located in operational proximity to the drive sheave carrying the elevator belt to produce a magnetic field encompassing the elevator belt;
a magnetic sensor located in operational proximity to the drive sheave carrying the elevator belt, the magnetic sensor comprising a plurality of signal channels spaced apart along a width of the magnetic sensor,
wherein the respective signal channels are activated by the proximity of the elevator belt to the signal channels as the elevator belt passes through the magnetic field generated by the magnetic field producer to determine a lateral position of the elevator belt on the drive sheave.

11. The elevator system as claimed in claim 10, wherein the elevator belt comprises at least one internal magnetic component.

12. The elevator system as claimed in claim 10, further comprising a belt position calculating unit used to determine the lateral position of the elevator belt on the drive sheave.

13. The elevator system as claimed in claim 12, further comprising a notification device to receive an output of the belt position unit, the notification device being configured to inform a user of the lateral position of the elevator belt on the drive sheave.

14. The elevator system as claimed in claim 13, wherein the notification device is configured to output an alert indication when the elevator belt has activated an outermost signal channel on the magnetic sensor or when the elevator belt has activated a signal channel located to the left or to the right of a sheave lateral center point by about 95%-105% of the width of the elevator belt.

15. The elevator system as claimed in claim 13, wherein the notification device comprises at least one of the following: a display, a remote monitoring station, a mobile device, an elevator car controller, and a master controller of the elevator system.

16. The elevator system as claimed in claim 10, wherein the width of the magnetic sensor is greater than a width of the elevator belt.

17. The elevator system as claimed in claim 10, wherein the width of the magnetic sensor is at least as wide as a width of the respective drive sheave section.

18. The elevator system as claimed in claim 10, wherein the magnetic sensor is a giant magneto-resistance sensor.

19. The elevator system as claimed in claim 10, wherein, as the elevator belt moves laterally on the drive sheave and relative to the magnetic sensor, the plurality of signal channels are activated in succession and indicate a direction of lateral movement of the elevator belt on the drive sheave.

20. A method of monitoring a position of an elevator belt reeved on an elevator drive sheave, comprising:
   producing a magnetic field in proximity to the elevator belt; and
   monitoring lateral movement of the elevator belt on the drive sheave with a magnetic sensor located in operational proximity to the drive sheave carrying the elevator belt, the magnetic sensor comprising a plurality of signal channels spaced apart along a width of the magnetic sensor,
   wherein the respective signal channels are activated by the proximity of the elevator belt to the signal channels as the elevator belt passes through the magnetic field generated by the magnetic field producer to determine a lateral position of the elevator belt on the drive sheave.

* * * * *